US012371090B2

(12) United States Patent
Flessa et al.

(10) Patent No.: US 12,371,090 B2
(45) Date of Patent: Jul. 29, 2025

(54) STROLLER AND STROLLER FRAME

(71) Applicant: CYBEX GmbH, Bayreuth (DE)

(72) Inventors: Thomas Flessa, Bayreuth (DE); Wolfram Fischer, Bayreuth (DE)

(73) Assignee: CYBEX GmbH, Bayreuth (DE)

( * ) Notice: Subject to any disclaimer, the term of this patent is extended or adjusted under 35 U.S.C. 154(b) by 516 days.

(21) Appl. No.: 17/753,955

(22) PCT Filed: Sep. 15, 2020

(86) PCT No.: PCT/EP2020/075700
§ 371 (c)(1),
(2) Date: Mar. 18, 2022

(87) PCT Pub. No.: WO2021/052928
PCT Pub. Date: Mar. 25, 2021

(65) Prior Publication Data
US 2022/0410959 A1    Dec. 29, 2022

(30) Foreign Application Priority Data
Sep. 18, 2019   (DE) .................. 20 2019 105 166.3

(51) Int. Cl.
*B62B 7/14* (2006.01)
*B62B 7/00* (2006.01)
*B62B 9/10* (2006.01)

(52) U.S. Cl.
CPC .............. *B62B 7/142* (2013.01); *B62B 7/008* (2013.01); *B62B 9/104* (2013.01)

(58) Field of Classification Search
CPC ......... B62B 7/142; B62B 7/008; B62B 7/145; B60Y 2200/83
See application file for complete search history.

(56) References Cited

U.S. PATENT DOCUMENTS 8,157,273 B2 * 4/2012 Bar-Lev .................... B62B 9/26
                                                         280/47.38
8,596,670 B2 * 12/2013 di Carimate ............ B62B 7/142
                                                         280/47.38
(Continued)

FOREIGN PATENT DOCUMENTS

CN          1978264 A       6/2007
CN       200995703 Y       12/2007
(Continued)

OTHER PUBLICATIONS

"Japanese Application No. 2022-517149, Notice of Reasons for Refusal dated Sep. 27, 2024", (Sep. 27, 2024), 7 pgs.
(Continued)

*Primary Examiner* — Steve Clemmons
(74) *Attorney, Agent, or Firm* — Schwegman Lundberg & Woessner, P.A.

(57) ABSTRACT

A stroller with a chassis frame which is supportable on a ground via at least three wheels and having
at least two receiving devices, in particular child receiving devices, which can be connected to the chassis frame via adapters, the adapters being designed and positionable on the chassis frame such that, with regard to a connection of the receiving devices as well as their alignment and, if appropriate, their manipulation, they do not allow at least one configuration in which the overall center of gravity of the transport device and receiving devices in top view and thus the overall center of gravity line does not lie within the projection area bounded by the wheels or their standing surfaces, and only permit such that the overall center of gravity of the transport device and receiving devices in top (Continued)

Figure 1:
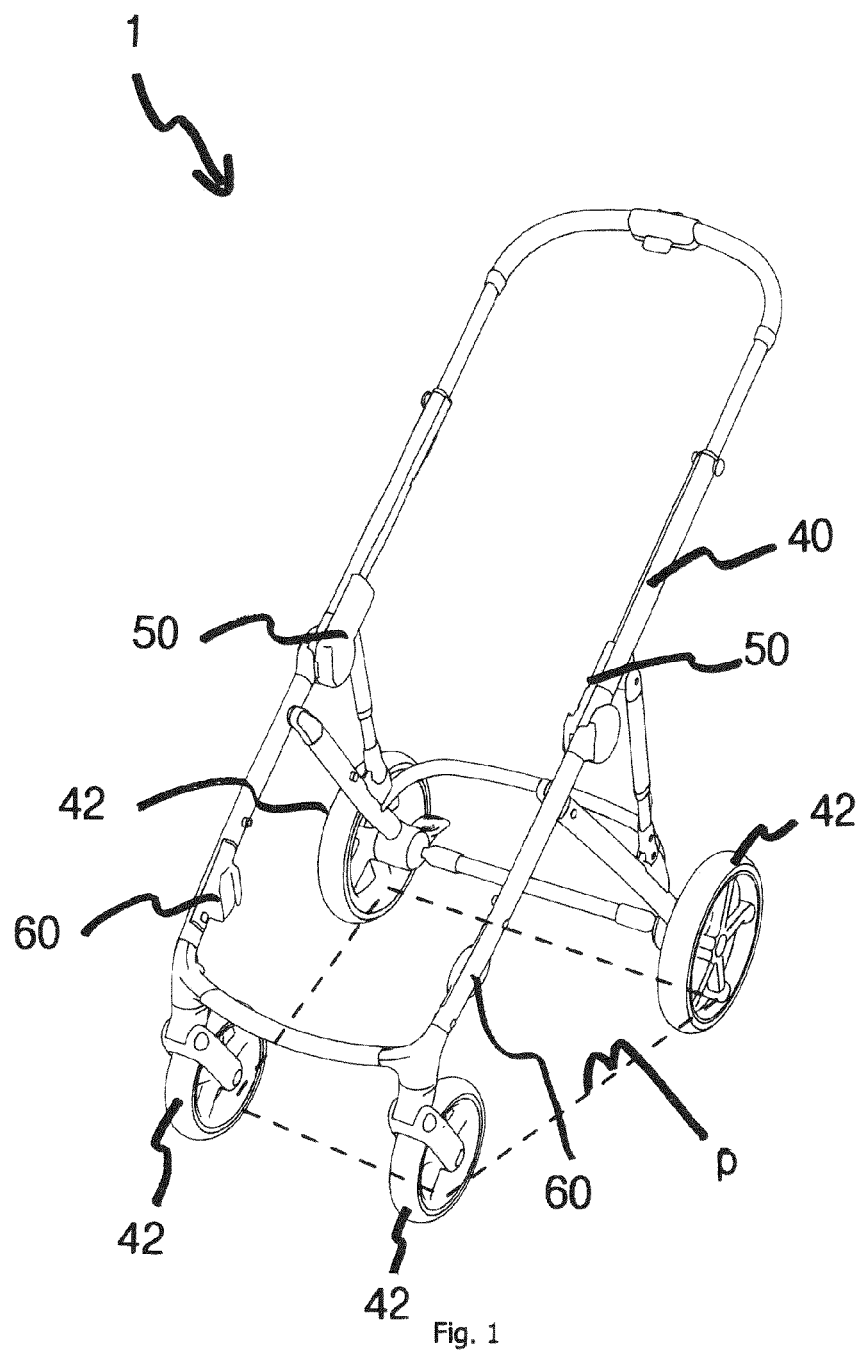

view and thus the overall center of gravity line always lies within the projection area bounded by the wheels or their standing surfaces.

29 Claims, 15 Drawing Sheets

(56) References Cited

U.S. PATENT DOCUMENTS

| | | | | |
|---|---|---|---|---|
| 8,857,830 | B2* | 10/2014 | Chen | B62B 7/08 |
| | | | | 280/47.35 |
| 9,849,903 | B1* | 12/2017 | Lai | B62B 7/008 |
| 10,207,731 | B2* | 2/2019 | Taylor | B62B 9/28 |
| 10,442,453 | B2* | 10/2019 | Haut | B62B 7/062 |
| 10,449,987 | B2* | 10/2019 | Gibson | B62B 7/06 |
| 11,052,933 | B2* | 7/2021 | Cheng | B62B 7/10 |
| 11,505,231 | B1* | 11/2022 | Zehfuss | B62K 27/003 |
| 2009/0121455 | A1 | 5/2009 | Kretschmer et al. | |
| 2010/0038887 | A1 | 2/2010 | Bar-Lev | |

FOREIGN PATENT DOCUMENTS

| | | | |
|---|---|---|---|
| CN | 101722975 A | 6/2010 | |
| CN | 105172868 A | 12/2015 | |
| EP | 1992543 A1 | 11/2008 | |
| EP | 2289762 A2 | 3/2011 | |
| JP | 2010505688 A | 2/2010 | |
| JP | U3164669 | 12/2010 | |
| JP | 2011240924 A | 12/2011 | |
| JP | 2015063296 A | 4/2015 | |
| WO | WO-2013139218 A1 | 9/2013 | |
| WO | WO-2014042524 A1 * | 3/2014 | ............ B62B 7/008 |
| WO | WO-2021052928 A1 | 3/2021 | |

OTHER PUBLICATIONS

"Japanese Application No. 2022-517149, Search Report by Registered Search Organization dated Sep. 17, 2024", (Sep. 17, 2024), 22 pgs.

"Chinese Application 202080078376.8, First Office Action dated Sep. 19, 2023", (Sep. 19, 2023), 15 pgs.

"International Application No. PCT/EP2020/075700, International Search Report and Written Opinion mailed Jan. 19, 2021", (Jan. 19, 2021), 26 pgs.

* cited by examiner

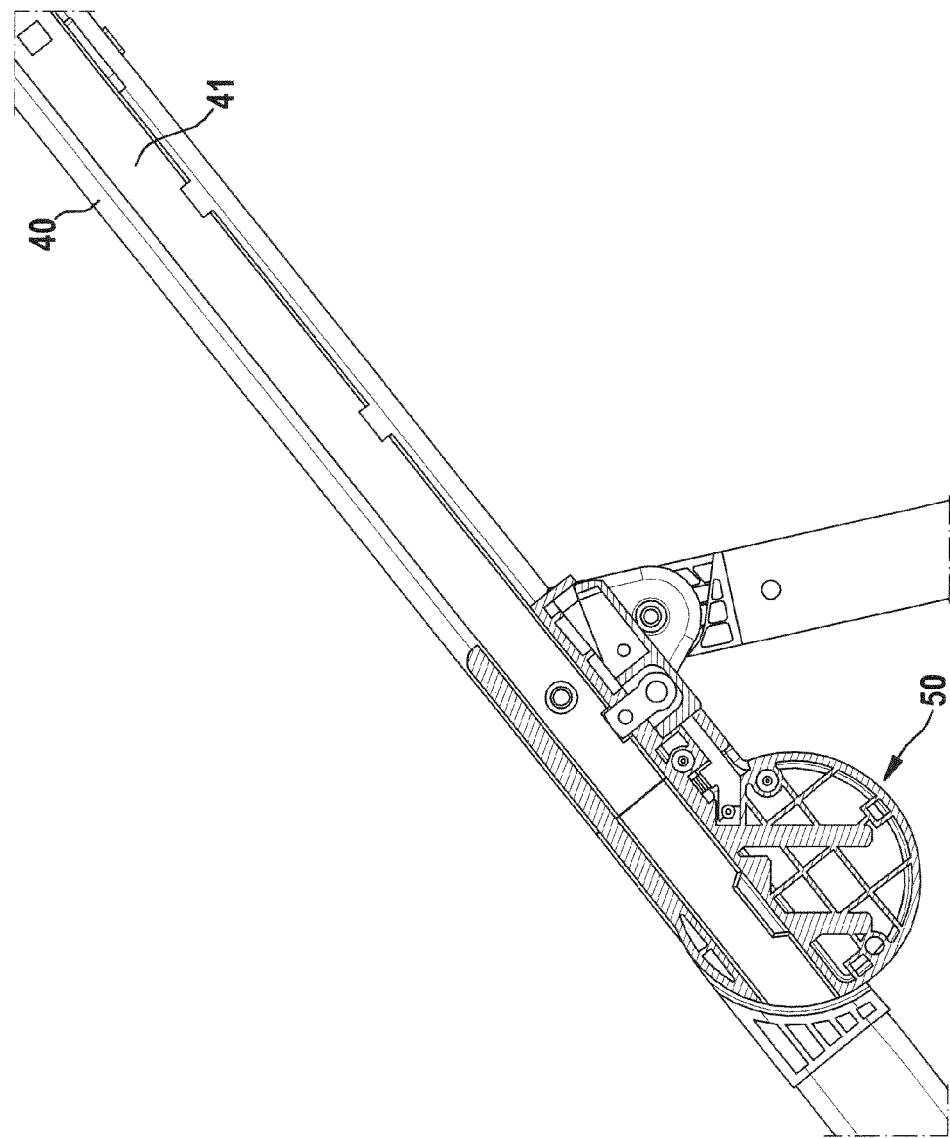

STROLLER AND STROLLER FRAME

PRIORITY CLAIM TO RELATED APPLICATIONS

This application is a U.S. national stage filing under 35 U.S.C. § 371 from International Application No. PCT/EP2020/075700, filed on 15 Sep. 2020, and published as WO2021/052928 on 25 Mar. 2021, which claims the benefit under 35 U.S.C. 119 to German Application No. 20 2019 105 166.3, filed on 18 Sep. 2019, the benefit of priority of each of which is claimed herein, and which applications and publication are hereby incorporated herein by reference in their entirety.

The present invention relates to a stroller.

Strollers and stroller frames with attachments arranged thereon, on which one or more child receiving devices can be mounted, are known in principle. Furthermore, it is known that such seat attachments can have different, sometimes variable, seating positions for children, infants and/or babies.

In particular, by the use of different seat attachments and/or differently adjustable seat positions of the seat attachments sometimes undesirable tipping situations can occur, since a sufficiently high stability of the stroller cannot be guaranteed for each seat attachment and/or each adjustable seat position.

Such undesirable tipping situations may further arise depending on the nature of the ground on which the stroller is standing. Furthermore, such tipping situations are favored by the stroller not being on a horizontal ground, but on an inclined ground, such as an ascending or descending path.

From the prior art are known especially approaches in which attempts are made to solve the problem described above with warnings in the operating instructions for the stroller advising against certain (unstable) configurations. In this case, however, despite the appropriate warnings in the operating instructions, there is still the risk that the warnings are (inadvertently) not taken into account, as a result of which (inadvertent) misuse of the stroller may occur.

It is therefore an object of the invention to provide a transport device, in particular a stroller with increased stability. A further object of the invention is to provide in particular a stroller with an (improved) protection against an (inadvertent) misuse. The aforementioned objects are preferably to be achieved by cost-effective, simple, safe and user-friendly solutions.

Increased stability can be understood in particular to mean that the transport device, in particular the stroller, does not tilt in any direction at least up to a certain angle, for example about 8° or about 10° or about 12° or about 15° with respect to the horizontal. Thus, the stroller shall be able to stand in any direction with respect to the tilt, in particular directed downward (such that the at least one front wheel is lower than the rear wheels, wherein a longitudinal direction of the stroller is perpendicular to a contour line of the inclined surface), directed upward (such that the at least one front wheel is higher than the rear wheels, wherein a longitudinal direction of the stroller is perpendicular to a contour line of the inclined surface) or laterally directed (such that a longitudinal direction of the stroller is parallel to a contour line of the inclined surface and/or such that a lateral boundary line connecting a front wheel and a rear wheel of a polygon defined by the support points of the wheels on which the transport device or the stroller stands is parallel to a contour line of the inclined surface).

The object is solved by a transport device according to claim 1 as well as a stroller according to claim 2, a stroller according to 9, a stroller according to 14 and a stroller according to 18.

In particular, the object of the invention is solved by a transport device, in particular a stroller, having a chassis frame which can be supported on a ground via at least three, in particular four, wheels, and having at least two receiving devices, in particular child receiving devices, which can be connected to the chassis frame via adapters, wherein the adapters are designed such and, where appropriate, positionable on the chassis frame such that, with regard to a connection of the receiving devices and their alignment (and, if appropriate, manipulation thereof), they do not permit at least one configuration in which the overall center of gravity of the transport device and receiving device(s) (in particular with and/or without load or child or children, if appropriate only with or only without load) in top view and thus the overall center of gravity line is not within the projection area bounded by the wheels or the standing surfaces thereof (at least in case of horizontal ground, if applicable in case of all, planar, grounds which have an angle of less than or equal to 20°, or at least less than or equal to 5°, with respect to the horizontal), and/or only permit that the overall center of gravity of transport device and receiving device (in particular with and/or without load or, if applicable only with or only without load) in top view (or view from above) and thus the overall center of gravity line always lies within the projection area bounded by the wheels or their standing surfaces (at least in the case of horizontal ground, if applicable in case of all, planar, grounds which have an angle of less than or equal to 20°, or at least less than or equal to 5°, with respect to the horizontal).

Alternatively or additionally, the adapters are designed such (and, if necessary, can be positioned on the chassis frame such) that they permit a connection of the receiving devices as well as their alignment (and, if necessary, a manipulation) only in such a way that the overall center of gravity of transport device together with the receiving device(s) (in particular with and/or without load, preferably child, if necessary only with or only without load, preferably child) is always within the projection area bounded by the wheels (at least in the case of horizontal ground) in top view.

Preferably, at least one of the two (further preferably both) receiving devices can be connected in two different orientations (in particular forward and backward orientation); however, due to the above condition(s), possibly not at all connection structures or via all adapters. At least one of the receiving devices can, for example, be oriented both forward and backward on a first connection structure, but only forward (or only backward) on a second connection structure. Alternatively or additionally, at least one of the receiving devices can be aligned (only) forward at a first connection structure, for example, but (only) backward at a second connection structure. At least one of the receiving devices can, if necessary, be aligned both forwards and backwards at a first and a second connection structure.

A (respective, possibly first) receiving device (possibly several or all receiving devices) can possibly be arranged only at a specific (e.g. first) connection structure or at least not at all connection structures provided in principle. Alternatively or additionally, a respective (possibly further or second) receiving device(s) (possibly several or all receiving devices) can be arranged at several or all connection structures provided, e.g. an upper and a lower connection structure.

At least one receiving device cannot be arranged on (connected to) at least one connection structure and/or cannot be aligned in a specific orientation on at least one connection structure (wherein the specific orientation is preferably possible on at least one further or second connection structure).

Preferably, at least one structurally prevented arrangement (connection) and/or structurally prevented alignment and/or structurally prevented tilt adjustment is such that, in the (only) theoretically considered case of realization, it would not fulfill at least one of the above conditions (in particular that the overall center of gravity of the transport device and receiving device (in particular, preferably with and/or without load, possibly only with or only without load in top view—or view from above—the overall center of gravity line, if applicable always, lies outside the projection area bounded by the wheels or their standing surfaces (at least in the case of horizontal ground, if applicable in case of all, planar, grounds which have an angle of less than or equal to 20°, or at least less than or equal to 5°, with respect to the horizontal).

In particular, the (respective, structurally permitted) line of gravity extending through the overall center of gravity of the transport device should extend through the aforementioned projection area. Then stability is ensured.

An idea of the invention is based in particular on that (fictitious) connections between all points of contact of the wheels of the chassis frame with the ground result in a polygon (disregarding, if necessary, connections lying in the interior of the polygon), wherein a—projected onto a plane defined by the polygon in the direction of action of the force of gravity—center of gravity in at least one configuration necessarily lies within the polygon.

By a point of contact is meant in particular (in the case of planar or at least substantially linear contact) the (contact) center and/or respective (surface) center (center of contact). If the respective wheel is rotatable, it is preferably to be assumed that the wheel is configured for straight-ahead travel.

An undesirable tipping situation always arises precisely when the center of gravity and the line of gravity of the (preferably loaded) transport device (or of the preferably loaded stroller) do not lie above the surface of the polygon, i.e. outside of it in top view.

The direction given by gravity is decisive, i.e. whether a straight line running through the center of gravity in the direction of gravity runs through the polygon (then, by definition, the center of gravity is above the polygon and the stroller, possibly loaded stroller, does not tip) or not (then, by definition, the center of gravity is not above the polygon and the stroller, possibly loaded stroller, can tip).

In embodiments, the stroller may have two front wheels and two rear wheels so that, in top view, a quadrilateral (in particular, a rectangle or a trapezoid) results as a polygon. In other embodiments, the stroller may have one front wheel and two rear wheels, resulting in a triangle (particularly an isosceles triangle) as a polygon.

With regard to the loading (load), a loaded transport device (a loaded stroller) is to be realized in particular when the (or at least one) receiving device is loaded, that is, when, for example, the receiving device or one of the receiving devices is a child receiving device and a child is received therein, or when the receiving device or one of the receiving devices is a shopping basket in which, for example, shopping is located.

A load per receiving device can in particular be up to 10 kg, or more than 10 kg and up to 15 kg, or more than 15 kg and up to 22 kg, whereby the load of different receiving devices of course need not be the same.

The object of the invention is further solved by a stroller comprising: at least a first and a second receiving device, which are designed in particular as child receiving device for receiving a child, infant and/or baby and/or as a transport device;
  a stroller frame;
  at least a first and a second adapter, via which the receiving devices can be detachably connected to the stroller frame;
  wherein a first receiving device has at least one (first) adapter connecting element with which the receiving device can be mechanically connected to the first and/or the second adapter, and a second receiving device has a (second) adapter connecting element with which the receiving device can be mechanically connected exclusively to one, preferably the first, of the two adapters.

An adapter is understood to mean, in particular, a pair of adapter elements, wherein the adapter elements preferably are arranged on a section of a side of a strut and/or a side of a slider of the stroller frame, preferably symmetrically with respect to each other with respect to a central plane of symmetry (running longitudinally through the stroller). Preferably, the adapters and the corresponding adapter connecting elements each have at least one contact surface that can contact each other or at least be arranged very close to each other (at a distance of at most two or one millimeter) when the receiving device is connected to the adapter (the stroller frame).

Preferably, the adapter can form (or comprise) a receiving device having at least one side wall, wherein the adapter connecting element can be mechanically coupled to the receiving device. The at least one contact surface of the adapter connecting element may form a part of the at least one side wall. When the adapter connecting element is fully received in the receiving device of the adapter, further movement of the receiving device relative to the stroller frame is at least substantially not possible. The receiving device is then fixed to the transport device, in particular the stroller.

A further key idea of the invention is based on the fact that the stroller frame comprises at least two, namely a first (upper) and a second (lower) adapter. Hereby, the lower adapter is arranged (in the state of use) closer to the ground and/or closer to the front wheels than the upper adapter. In this embodiment, it may be provided that the stroller frame is used together with (at least) two receiving devices (child receiving devices). Thereby, a first child-receiving device can be designed such that it is connectable both to the lower adapter and to the upper adapter on the stroller frame. A second receiving device (child receiving device) can be designed such that it is connectable exclusively to one of the adapters, preferably the lower adapter, but not to the other (upper) adapter.

Furthermore, it may be provided that the adapter connecting element of the second receiving device (child receiving device)—but not that of the first receiving device (child receiving device)—has a protrusion, such as a rib or a tongue (in the sense of a tongue-and-groove connection), whereby the lower adapter (but not the upper adapter) has a corresponding recess (a corresponding recess), for example a groove, which permits mechanical connection of the adapter connecting element of the second receiving device (child receiving device) to the lower adapter.

A mechanical connection of the second receiving device (child receiving device) to the upper adapter is thus prevented, whereas the first child receiving device is suitable to be selectively connected to the upper or the lower adapter.

Furthermore, an inversion is possible such that the first receiving device (child receiving device) has a protrusion and/or the upper adapter has a recess (a recess). Likewise, an inversion is possible such that one of the adapters has the protrusion and the adapter connecting element of one of the receiving devices (child receiving devices) has a recess (a recess).

In particular, at least one of the two receiving devices (child receiving devices) may be formed as a seat unit having a seat section and a back section, wherein the back section may serve for leaning the back and head of a child. Furthermore, the seat unit can additionally have a leg section. Seat section and back section, as well as optionally seat section and leg section, may be hingedly connected to each other so that differently inclined positions (sitting and lying positions) may be adjusted, wherein a locking mechanism may be provided for fixing the respective positions.

Furthermore, or alternatively, all sections can be tilted together with respect to the receiving connecting element provided for connection to the stroller frame, so that the seat unit can assume different tilts with respect to the frame. Typically, a seat unit can be used either rearwardly or forwardly oriented and, for this purpose, can either be rotatably connected to the stroller frame (preferably via a single adapter arranged centrally in top view and not formed as a pair) or, alternatively, can be removed from the stroller frame and put back on rotated by about 180°.

A receiving device (child receiving device) designed as a lying unit can have a (possibly padded) floor, e.g. in one, two, three or more parts, as well as side walls for lateral boundary. At a minimum, the lying unit can be connected to the frame such that the floor is oriented substantially horizontally. In addition, if necessary, the floor and side walls may be tilted together with respect to the counter structure provided for connection to the frame so that the lying unit may assume different tilts relative to the chassis frame. Typically, a lying unit may be connected to the frame in a rearward orientation. It may also be that the lying unit can be removed from the frame and put back on rotated by about 180°. This is not common, however, because one wants to enable very young children (who are transported in a lying unit) to always make eye contact with the person pushing them, if possible.

A receiving device (child receiving device) designed as combined seat/lying unit can be transformed from a seat unit into a lying unit by means of a suitable mechanism.

A receiving device (child receiving device) designed as an infant carrier may be suitable for transporting a baby or young child (usually up to an age of about one year or about 15 months, although this is not important for the invention) in a motor vehicle, in particular in an automobile.

The infant carrier may be of one-piece construction (monolithic), in which case the one-piece infant carrier may well be constructed from a plurality of elements fixedly connected to one another, or of multiple-piece construction. In the multi-piece embodiment, the infant carrier may include a seat section and a back section, wherein the back section may serve for leaning the back and head.

Further, in embodiments, the infant carrier may have a leg section. Seat section and back section, and optionally seat section and leg section, may be hingedly connected to each other so that differently inclined positions (sitting and lying positions) may be adjusted, wherein a locking mechanism may be provided to fix the respective positions.

Furthermore, or alternatively, all sections can be tilted together relative to the adapter connecting element provided for connection to the stroller frame, so that the seat unit can assume different tilt angles relative to the stroller frame. Typically, an infant carrier can be connected to the stroller frame in a rearward-facing manner.

It can also be that the infant carrier can be removed from the stroller frame and be put back on rotated by 180°. This is not common, however, because one wants to enable very young children (who are transported in an infant carrier) to always make eye contact with the person pushing them, if possible.

The stroller frame may comprise various frame parts, in particular one or more front wheel struts, one or more rear wheel struts and a pusher, and possibly other struts or frame parts. Two or more frame parts may be connected to each other, either fixedly or movably, for example articulatedly or telescopically.

Further, the stroller frame may comprise several wheels, particularly two rear wheels and at least one front wheel. Each wheel may rotate (at least) about a horizontal axis, wherein preferably all rear wheels rotate about the same first axis. The first axis may, in particular, be formed as a physical axis. The at least one front wheel may rotate about a second axis, wherein the second axis is parallel to the first axis when driving straight ahead. In particular, to facilitate cornering, at least one of the or all wheels may optionally be rotatable about a (respective) vertical axis.

During non-tilted use of the stroller, all wheels are in contact with the ground. In the case of the stroller, a forward tilt may be understood to mean that the at least one front wheel continues to contact the ground while one or more (especially all) of the rear wheels lift off the ground. Tilting backward may be understood to mean that the rear wheels continue to contact the ground while one (or if present, several, in particular all) of the at least one front wheel lifts off the ground.

All features and associated advantages described in connection with the transport device according to the invention are applicable and transferable to the stroller according to the invention.

In particular, the first adapter has at least one recess, which is in particular in the form of a groove, and the adapter connecting element of the second receiving device has at least one protrusion, which is in particular complementary to the recess of the first adapter, which is in particular in the form of a rib. In this way, a secure connection of the adapter connecting element of the second receiving device to the first adapter is achieved in manner as simple as possible.

In one embodiment, the at least one protrusion of the adapter connecting element of the second receiving device couples with the recess of the first adapter when the receiving device is connected to the first adapter in a first orientation, whereby the receiving device is connected to the first adapter and thereby to the stroller frame in a first orientation.

Preferably, the first adapter has a further recess, which is also formed in particular as a groove, and the at least one protrusion of the adapter connecting element of the second receiving device couples with the further recess of the first adapter when the receiving device is connected to the first adapter in a further, preferably at least substantially opposite to the first orientation, orientation. This makes it possible to connect the receiving device to the first adapter, and thereby to the stroller frame, in a second orientation.

In particular, the second adapter has an at least substantially planar contact surface, and in particular, the adapter connecting element of the first receiving device also has an at least substantially planar contact surface, thereby mechanically preventing that the at least one protrusion of the adapter connecting element of the second receiving device can be coupled to the second adapter.

In a further embodiment, the one or more adapters are arranged on the first and/or second receiving device instead of on the stroller frame, and the associated adapter connecting elements are arranged on the stroller frame.

Furthermore, the object of the invention is solved by a stroller comprising: at least a first and a second receiving device, which are designed in particular as a child receiving device for receiving a child, infant and/or baby and/or as a transport device;
a stroller frame;
at least a first and a second adapter, via which the receiving devices can be detachably connected to the stroller frame;
wherein the first receiving device comprises a seat section and a back section pivotable relative thereto as well as a mechanism for adjusting a tilt angle of a first number of tilt angles between back section and seat section, and the second receiving device comprises a seat section and a back section pivotable relative thereto as well as a mechanism for adjusting the tilt angle of a second number of tilt angles, different from the first number, between back section and seat section.

Furthermore, the object of the invention is solved (in particular alternatively or additionally to the preceding paragraph) by a stroller comprising:
at least a first and a second receiving device, which are designed in particular as a child receiving device for receiving a child, infant and/or baby and/or as a transport device;
a stroller frame;
at least a first and a second adapter, via which the receiving devices can be detachably connected to the stroller frame;
wherein the first receiving device comprises a seat section and a back section pivotable relative thereto as well as a mechanism for adjusting an tilt angle between back section and seat section, and the second receiving device comprises a seat section and a back section pivotable relative thereto as well as a mechanism for adjusting the tilt angle between back section and seat section, wherein with the mechanism for adjusting the tilt angle of the first receiving device at least one particular tilt angle can be adjusted that cannot be adjusted by the mechanism for adjusting the tilt angle of the second receiving device, and/or wherein with the mechanism for adjusting the tilt angle of the second receiving device at least one particular tilt angle can be adjusted that cannot be adjusted by the mechanism for adjusting the tilt angle of the first receiving device. Another aspect of the present invention is based on the fact that further, the first receiving device (child receiving device) may be adjustable to a plurality (for example, two or more) of tilt positions.

As previously described, this can be done either by tilting the counter structures relative to the remaining parts of the receiving device (child receiving device), or by pivoting individual sections relative to each other.

In particular, the mechanism of the first receiving device allows the adjustment of a greater number of different tilt angles between back section the seat section than the corresponding mechanism of the second receiving device, whereby systematically certain tilt angles of the second receiving device between back section and seat section can be avoided.

It is preferred that at least one (upright) seat position, one (flat) lying position and at least one intermediate position are adjustable. The seat position may have an angle (tilt angle) of the back section relative to the seat section of from about 90° to about 140°, preferably from about 105° to about 125°. The lying position may have an angle (tilt angle) of the back section relative to the seat section of from about 140° to about 180°, preferably from about 150° to about 170°. A first or more intermediate positions may have an angle (tilt angle) of the back section relative to the seat section that is greater than the angle in the seat position, but less than the angle in the lying position.

For a second, possibly present, intermediate position, the angle (tilt angle) of the back section relative to the seat section may have greater than the angle in the first intermediate position but less than the angle in the lying position. The angles (tilt angles) for possibly present third and further intermediate positions may be defined analogously to above. In a specific embodiment, a seat position can be designed with an angle (tilt angle) of at least about 115°, a first intermediate position can be designed with an angle (tilt angle) of at least about 130°, a second intermediate position can be designed with an angle (tilt angle) of at least about 145°, and a lying position can be designed with an angle (tilt angle) of at least about 160°.

The second receiving device (child receiving device) may (among other things) differ from the first in that one or more of the tilt positions is or are not present (or not adjustable). In this regard, the most inclined position (in particular, the lying position) may be the or one of the non-present positions. However, one or more of the intermediate positions may also not be present (if they are present in the first child receiving device). In particular, the absence of an intermediate position may be preferred for positions having an angle of at least about 130° to at least about 150°, preferably at least about 140° to less than at least about 150°. This is because a different distribution of mass in the child receiving device can be expected from a certain angle on, so that a position with an angle of just under at least about 150° may be more critical than a position with an angle of at least about 160°.

In particular, the second receiving device (child receiving device) may provide the same seat position and the same lying position as the first receiving device (child receiving device), but not the intermediate position or one of the several intermediate positions. The different positions may be formed via corresponding structures that are engaged with each other for locking and disengaged for unlocking. Specifically, the structures may be, for example, a tooth rim (having outwardly facing teeth or protrusions) and a swing bearing (i.e., a ring with recesses on the inner surface), or one or more pins for engaging corresponding holes in the counter structure.

Furthermore, all features and associated advantages described in connection with the transport device according to the invention and the previously described stroller according to the invention are applicable and transferable to the (following) stroller according to the invention.

In particular, the mechanism of the first receiving device allows the setting of a greater number of different tilt angles between back section and seat section than the corresponding mechanism of the second receiving device. Hereby, in particular in the case of the second receiving device, the use of the receiving device with tilt angles between back section and seat section which are unfavorable for the stability of the stroller can be avoided.

In one embodiment, by the mechanism for adjusting the tilt angle between the back section and the seat section of the first receiving device at least the following positions are adjustable:
- a seat position in which the tilt angle of the back section relative to the seat section is in a range from at least about 90° to at least about 140°, preferably from 105° to 125°;
- a lying position in which the tilt angle of the back section relative to the seat section is in a range from at least about 140° to at least about 180°, preferably from at least about 150° to at least about 170°;
- as well as one or more intermediate positions in which the tilt angle of the back section relative to the seat section is less than the tilt angle in the lying position and greater than the tilt angle in the seat position. By that a particularly convenient adjustment of the tilt angle of the back section relative to the seat section can be done.

In particular are at least the following positions are adjustable by the mechanism for adjusting the tilt angle of the second support device:
a seat position in which the tilt angle of the back section relative to the seat section is in a range from at least about 90° to at least about 140°, preferably from at least about 105° to at least about 125°;
- a lying position wherein the tilt angle of the back section relative to the seat section is in a range from at least about 140° to at least about 180°, preferably from at least about 150° to at least about 170°;
- as well as one or more intermediate positions wherein the tilt angle of the back section relative to the seat section satisfies at least one of the following conditions:
  the tilt angle is less than about 150°, preferably less than about 140°, and greater than the tilt angle in the seat position; and
  the tilt angle is greater than about 150°, preferably greater than about 155°, and smaller than the tilt angle in the lying position. Hereby, on the one hand, a particularly convenient adjustment of the tilt angle of the back section with respect to the seat section can be made, whereby a certain range of the tilt angle between about 140° and somewhat 150° can be avoided, which in particular has an unfavorable effect on the tilting properties of the stroller.

The problem of the invention is further solved by a stroller comprising: at least a first and a second receiving device, which are designed in particular as child receiving device for receiving a child, infant and/or baby and/or as a transport device;
  a stroller frame;
  at least one first and one second adapter, via which the receiving devices can be detachably connected to the stroller frame;
  wherein at least one, preferably the first, of the two adapters has an adjusting mechanism via which the at least one adapter is detachably connectable to the stroller frame, wherein in particular the position of the at least one of the two adapters is adjustably fixable in a horizontal and/or vertical direction with respect to the stroller frame.

Another aspect of the invention is based on the stroller frame of the stroller comprising, in particular, at least one first (upper) and at least one second (lower) adapter. In particular, the stroller frame may comprise exactly two, namely a lower and an upper adapter. The second (lower) adapter shall thereby be attachable closer to the ground and/or closer to the front wheels than the first (upper) adapter. The second (upper) adapter shall be adjustably arranged between a front and a rear position on the frame. The adjustment of the adapter position can be achieved by an adjustment mechanism. Here, it may be provided that the stroller frame is used together with (at least) two receiving devices.

Again, all features and associated advantages described in connection with the transport device according to the invention and the previously described strollers according to the invention are applicable and transferable to the following stroller according to the invention.

In one embodiment, the at least one of the two adapters is slidably mounted on the stroller frame, in particular longitudinally laterally on struts extending from the top rear to the bottom front thereof, whereby the position of the at least one of the two adapters can particularly easily be fixed in an adjustable manner.

In particular, the at least one of the two adapters can be fixed, in particular latchably, in several, different positions on the stroller frame by means of the adjustment mechanism. This allows the position of the at least one of the two adapters to be adjusted and fixed in a simple and convenient manner. Preferably, the at least one of the two adapters is fixable, in particular latchable, to the stroller frame with the adjustment mechanism in exactly or at least three positions.

The object of the invention is further solved by a stroller, comprising: at least one receiving device, which is in particular designed as a child receiving device for receiving a child, infant and/or baby and/or as a transport device;
  a stroller frame;
  at least one adapter by means of which the receiving device can be detachably connected to the stroller frame;
  wherein
  an adapter connecting member of the receiving device has a blocking mechanism for blocking a mechanism for adjusting the tilt angle between back section and seat section formed on the receiving device, wherein the tilt angle adjusting mechanism is blocked by the blocking mechanism when the receiving device is connected to the stroller frame via the adapter in a first orientation, while the tilt angle adjustment mechanism is not, in particular by the blocking mechanism, blocked when the receiving device is connected to the stroller frame via the adapter in a further, preferably at least substantially opposite to the first orientation, orientation.

A further aspect of the invention is based on the fact that the receiving device (child receiving device) can be brought (adjusted) into different positions or orientations, wherein, for example, by tilting of individual sections of the receiving device relative to each other, the adapter connecting element (the contact protrusion surface of the adapter) a blocking mechanism can be activated, whereby an influence on the adjustment possibilities and/or the adjustment of the receiving device can be achieved.

Specifically, a blocking mechanism may be formed as a (possibly spring-loaded) pin arranged asymmetrically with respect to a (notional) vertical axis through the center of the adapter connecting element. The pin may be depressible in the first position (e.g., in the seat position) and non-depressible in the second position (e.g., in all positions except the seat position), because, e.g., by changing the position, an element connected to the backrest, which may for example be provided with a recess is blocked by the pin.

Furthermore, on one side (which corresponds, e.g., to a forward connection of the child receiving device to the stroller frame), the adapter may be configured such that space for the pin is left free so that the pin is not displaced. In the other direction (which corresponds, e.g., to a rearward connection of the child receiving device to the frame), for example, a run-up bevel or a comparable structure can be arranged on the adapter so that upon connection of the child receiving device to the adapter (the stroller frame), the pin is pushed in.

Thereby, when the pin is depressed, the movement of the element may be blocked or restricted by the pin, for example by the pin being received in a corresponding hole, slot or recess. In this way, it can be realized that the child receiving device can be connected to the stroller frame in a first orientation, in which case all positions can be reached. On the other hand, in the other orientation, the child receiving device can only be connected to the frame when it is in a (or the) suitable position, with the other positions that are not suitable for connection being inaccessible even in the connected state.

By the above mentioned positions are generally meant different angles between seat section and back section of a child seat unit.

Further, all features and associated advantages described in connection with the transport device according to the invention and the strollers according to the invention described above are applicable and transferable to the (following) stroller according to the invention.

In a further embodiment, the adapter has a contact protrusion surface arranged such that the contact protrusion surface actuates the blocking mechanism when the receiving device is connected to the stroller frame in a first orientation via the adapter. Therewith, in a structurally simple manner, it will be prevented that the receiving device can be brought into a flatter (lying) position when the receiving device is connected to the adapter in a first orientation. It is thus prevented that in a first orientation, in which, for example, an increase in the tilt angle of the back section relative to the seat section would have an unfavorable effect on the stability of the stroller, the tilt angle of the back section relative to the seat section can be increased.

Preferably, the locking mechanism has a spring-loaded pin which is pressed by the contact protrusion surface of the adapter against a restoring force acting on the spring-loaded pin into a recess, preferably in a recess of the tilt angle adjustment mechanism, so that the tilt angle adjustment mechanism is locked or locked. By this in a simple, constructive manner a blocking mechanism in a child seat unit about an axis preferably extending approximately vertically to the seat surface of the seat section, with the previously specified functionality, is realized.

In particular, the receiving device is rotatably mounted on the stroller frame, in particular about an approximately vertically extending axis, whereby the receiving device can be very easily aligned in several possible orientations with respect to the stroller frame.

It is preferred that the rotational position of the receiving device is adjustable, in particular lockable in two positions. Preferably, the receiving device is lockable in a forward position and in a rearward position. In particular, the receiving device is connectable to the stroller frame via a rotatably mounted adapter, in particular an adaptive turntable.

It is preferred that the rotatably mounted adapter, in particular the turntable, or the receiving device is assigned a switching element, such as slider, rotary knob, pushbutton, or push-button or the like, with which the adjustable rotational positions or orientations of the receiving device are fixable.

In a further embodiment, the switching element is exclusively adjustable from a first switching position to at least one second switching position when the receiving device is not coupled to the adapter, in particular is not fixed to the adapter.

In particular, the rotatably mounted adapter is unlocked and the rotational positions or orientations of the receiving device are freely fixable, if the switching element is in the first switching position.

Preferably, the receiving device can be locked in a forward oriented position and in a rearward oriented position, if the switching element is in the second switching position.

In a further embodiment, the receiving device, apart from for the transport of a child, infant or baby, may be configured as a device for transporting animals or other objects.

Further embodiments will be apparent from the dependent claims.

In general, a stroller comprises a frame (stroller frame) and at least one receiving device. The receiving device is detachably connected to the frame, for example by means of at least one adapter provided for this purpose on the frame. The receiving device is preferably a child receiving device, in particular a seat unit, a lying unit, a combined seat/lying unit or an infant carrier (suitable for transporting an infant in a motor vehicle), but it can also be another transport device, e.g. a shopping basket or another transport device for transporting objects. The receiving device comprises complementary counterparts to the frame-side adapter or adapters, or is detachably connectable thereto via intermediate adapters. In particular, the frame may also comprise several adapters for attaching one or more receiving devices, preferably exactly one adapter or exactly one pair of adapters per receiving device. In this context, in the following, unless otherwise explicitly mentioned, an adapter shall be understood as that structure which is provided for connection to exactly one receiving device, even if it is, e.g., a pair of adapter elements (e.g., a right adapter element and a left adapter element). A stroller within the meaning of the present invention is in particular also present if adapters for several receiving devices are provided, but only one receiving device is connected to the frame. In the case of strollers of this type, it may happen, depending on the configuration, that the stability or steadiness is not as good as desired, or in other words that the entire stroller may tip over more easily than desired, and in particular to the front or to the rear, possibly also to the side or in a direction lying between the listed directions.

In one embodiment, at least one of the adapters and/or the counterpart of a receiving device, preferably forward and rearward connectable child receiving device, has an asymmetry. This is a central (further illustrative or also independent) idea of the invention. Via the asymmetry it is possible to differentiate the adjustment possibilities available in forward or backward direction of the child receiving device (with respect to the frame). To enable connection of the child receiving device in both forward and rearward directions, at least either the adapter or the counterpart may have substantially a two-count rotational symmetry. The asymmetry is a deliberate deviation from this principle, which may be in particular structurally formed. For example, it can be a protrusion or recess, whereby a protrusion can possibly also be designed to be movable, e.g. as a pin that can be pressed in. Preferably, the asymmetry is intended to relate to the contact surface of the adapter and/or the counter structure.

In a further execution example, the child receiving device comprises a fixed protrusion, e.g. a rib in the counter structure. The adapter has a groove in a front area such that the child receiving device can only be connected to the frame in a forward but not backward direction (or exactly the other way around). Of course, an interchange of protrusion and groove is possible.

According to an embodiment, the frame may comprise at least two adapters (for attaching at least two receiving devices), in particular at least one lower adapter and at least one upper adapter. In particular, the frame may have exactly two, namely a lower and an upper adapter. The lower adapter shall be closer to the ground and/or closer to the front wheels than the upper adapter. The upper adapter shall be adjustably arranged between a front and a rear position on the frame. The adjustment of the adapter position can be done in various ways, but preferably by sliding. According to the invention, it can be that the upper adapter may have an asymmetry in its rear position which it does not have in the front position (or vice versa) by adjusting an asymmetry element during the adjustment (during sliding) and caused by it between a rest position and an operative position, wherein the asymmetry cooperates with the counterpart of the child receiving device only in the operative position (and e.g. for example prevents its attachment to the frame or restricts it to certain positions such as the seat position), and in the rest position does not cooperate with the counterpart of the child receiving device.

In a further embodiment, the frame comprises an adapter and the child receiving device comprises a counterpart, which enable a rotatable connection between frame and child receiving device. In this regard, the rotation shall be about a substantially vertical axis. The child receiving device shall be lockable relative to the frame in at least two, preferably exactly two, positions. Particularly preferably, the two positions are a forward position and a rearward position. In addition, the child receiving device shall comprise a switch which allows a positioning of the child receiving device between a first position (for use of the child receiving device with a load of maximum 15 kg) and a second position (for use of the child receiving device with a load of maximum 22 kg). The switch may be, for example, a sliding knob or a rotary knob or a push-button or a toggle switch. Preferably, the switch should only be able to be adjusted from the first position to the second position and back when the child receiving device is completely detached from the frame. When the switch is in the first position, a connection of the child receiving device to the frame is possible in all (both) lockable positions, and the rotation with the child receiving device connected to the frame and the opened position lock is unrestrictedly possible. However, if the switch is in the second position, a connection is preferably only possible in a forward position of the child receiving device relative to the frame, and furthermore the rotation of the child receiving device relative to the frame is not possible. This can be specifically achieved, e.g., in that the adapter of the frame has a recess or receiver in its contact surface which is not rotationally symmetrical with respect to the substantially vertical axis of rotation. Accordingly, the contact surface of the counter structure of the child receiving device may have a corresponding asymmetry element which is recessed in the contact surface of the counter structure and thus assumes a rest position when the switch is in its first position. By moving the switch to its second position, the asymmetry element can also be moved to an operative position in which it forms a protrusion with respect to the surrounding contact surface of the counter structure, which protrusion can cooperate with the receiver or recess in the adapter in the forward position of the child receiving device with respect to the frame, but which in all other positions (in particular in the rearwardly directed position) blocks a connection of the child receiving device with the frame (because there is no receiver or recess at the corresponding position of the contact surface of the adapter), and which at the same time permits a rotation of the child receiving device relative to the frame only within the limits predetermined by the dimensioning of the reception or recess, wherein the receiver or recess preferably is as wide as the protrusion.

The above-mentioned object is further solved in particular by a system and/or an arrangement comprising the above stroller as well as at least or exactly one child in the first receiving device and/or at least one or exactly one child in the second receiving device.

The above object is further particularly solved by the use of the above stroller and/or above system, wherein at least or exactly one child is placed in the first receiving device and/or at least one or exactly one child is placed in the second receiving device, preferably for accommodating and/or transporting the child or the children.

The above-mentioned object is further solved in particular by a method comprising the accommodation and/or transportation of at least one child, for which purpose preferably the above-mentioned stroller and/or the above-mentioned system is (are) provided. The functional features and/or indications of purpose explained in the context of the stroller and/or the system may be carried out as method steps with regard to the method.

Insofar as further above states with load or without load (and corresponding conditions) are mentioned, this shall mean in particular with regard to the system, the use and the method that once a determination of the center of gravity is to be carried out (completely) without child or children and the other time a determination of the center of gravity with at least one child in at least one receiving device, if necessary with several children in the several receiving devices or in each receiving device at least or exactly one child.

Figure 2:
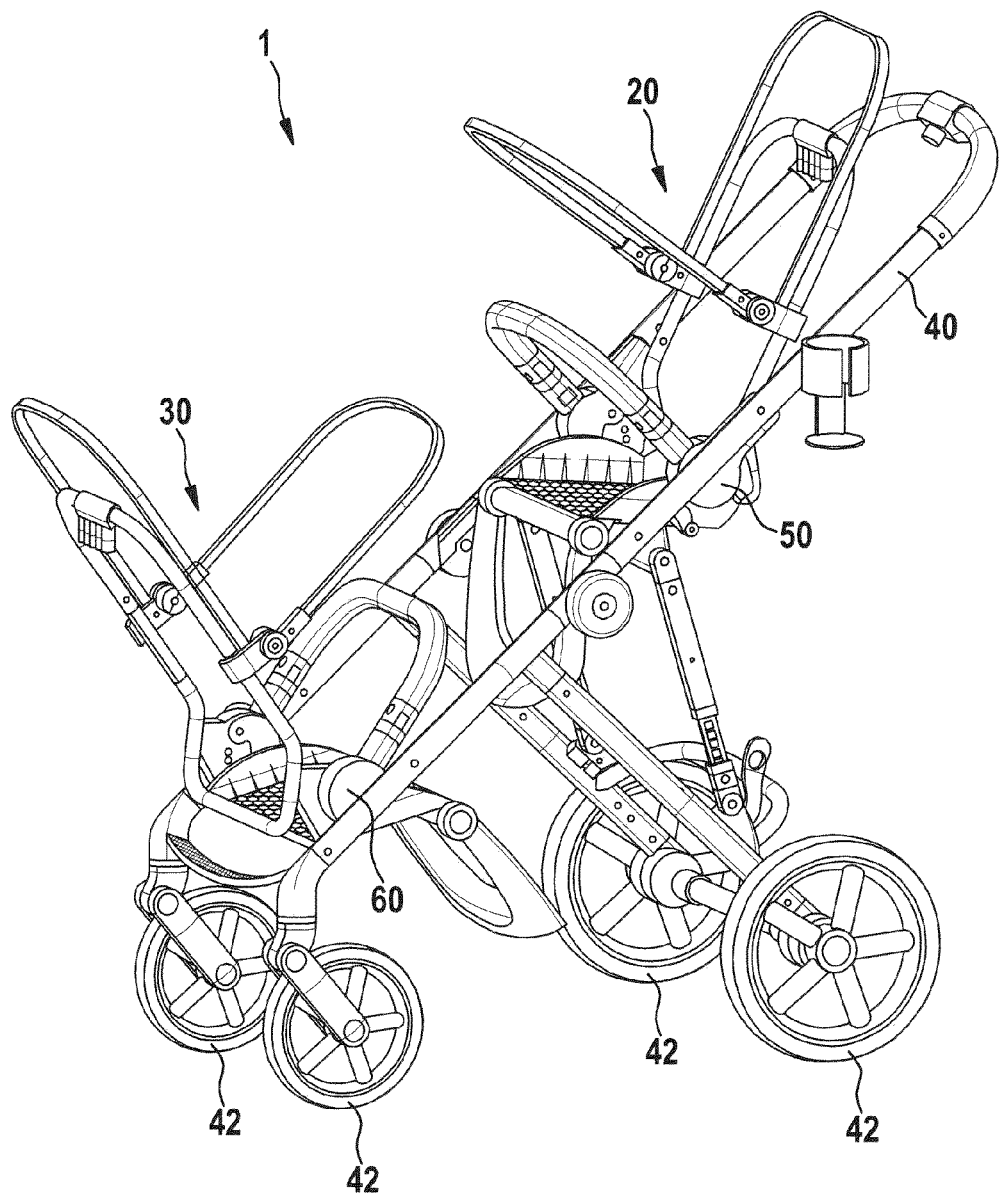
Figure 3:
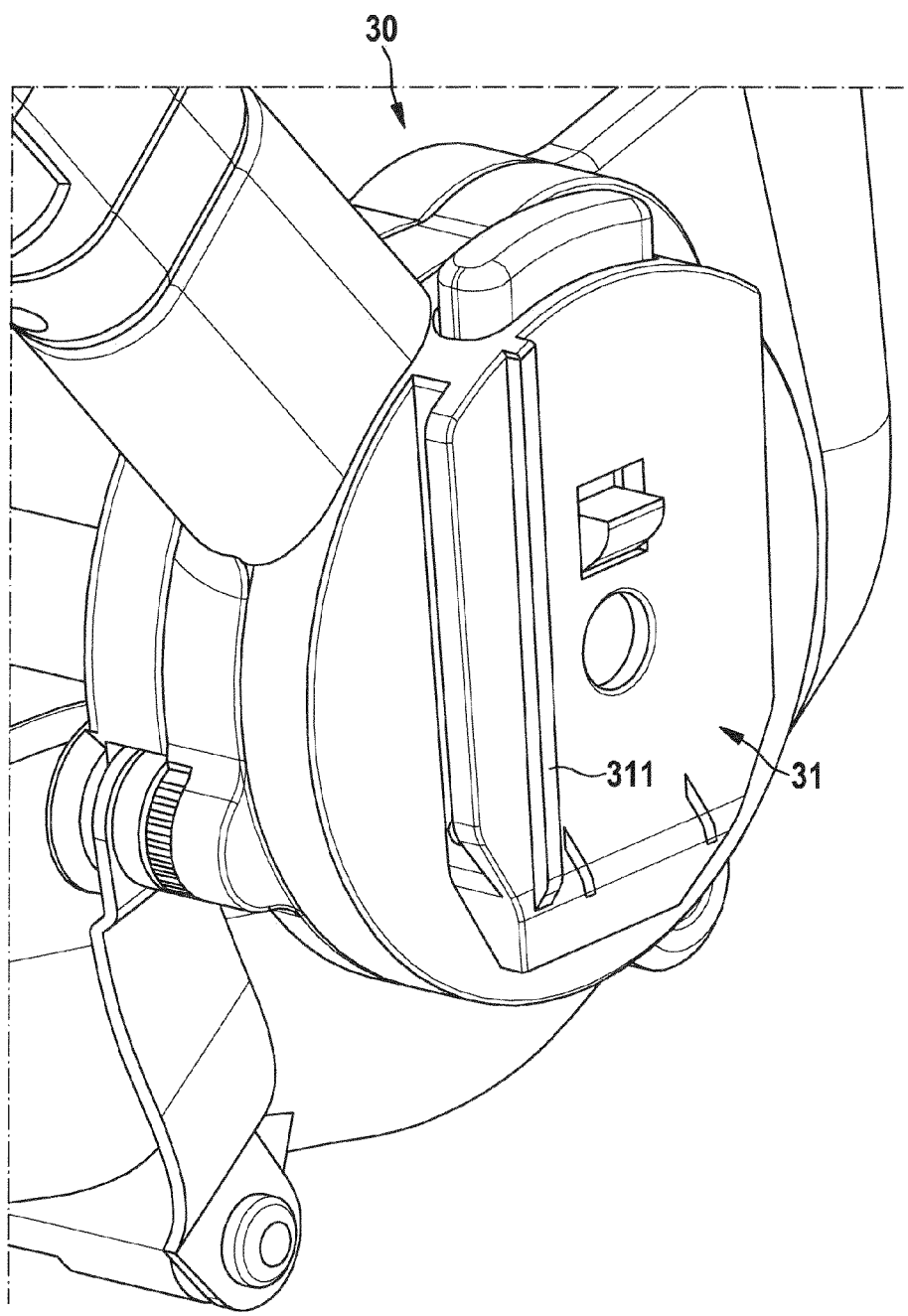
Figure 4:
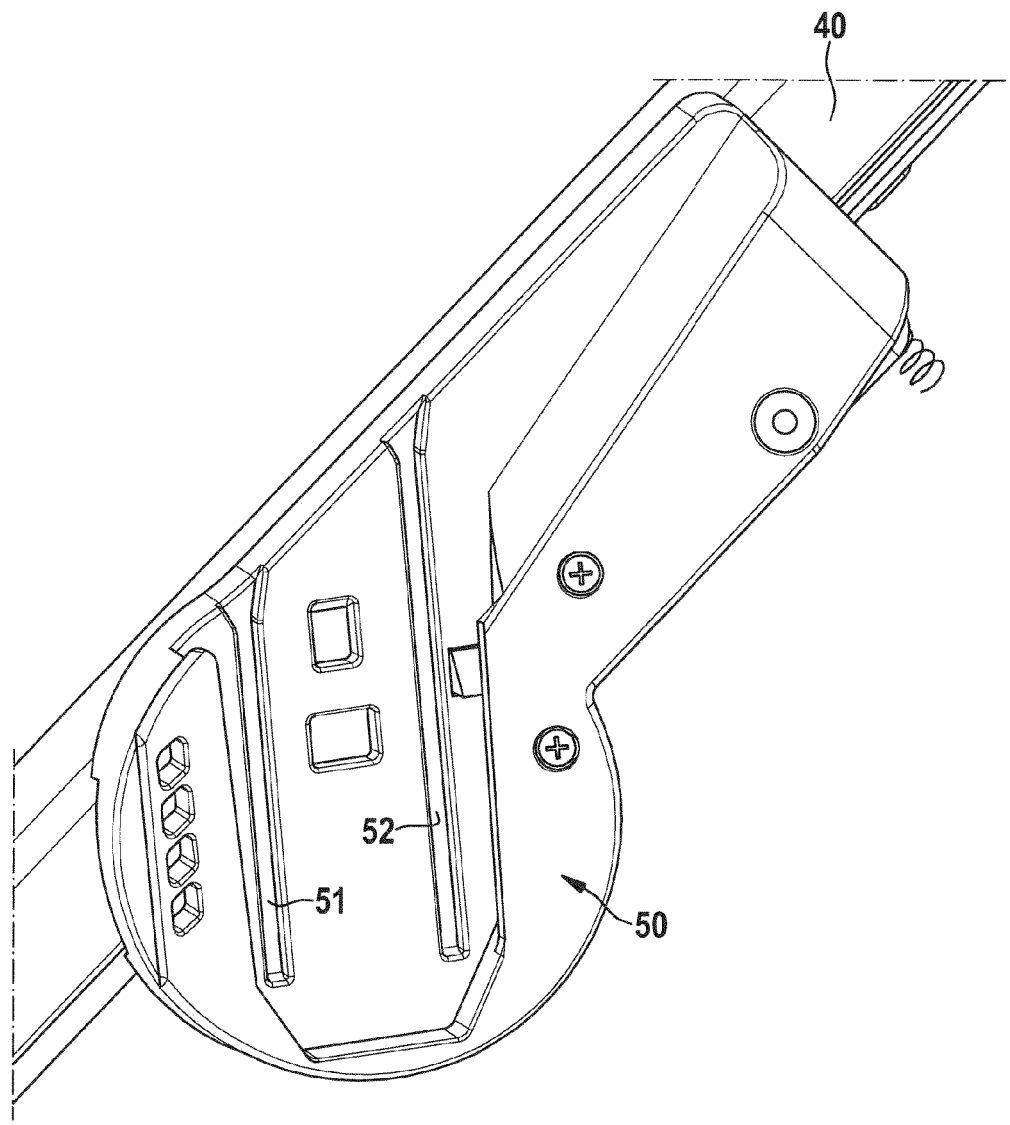
Figure 5:
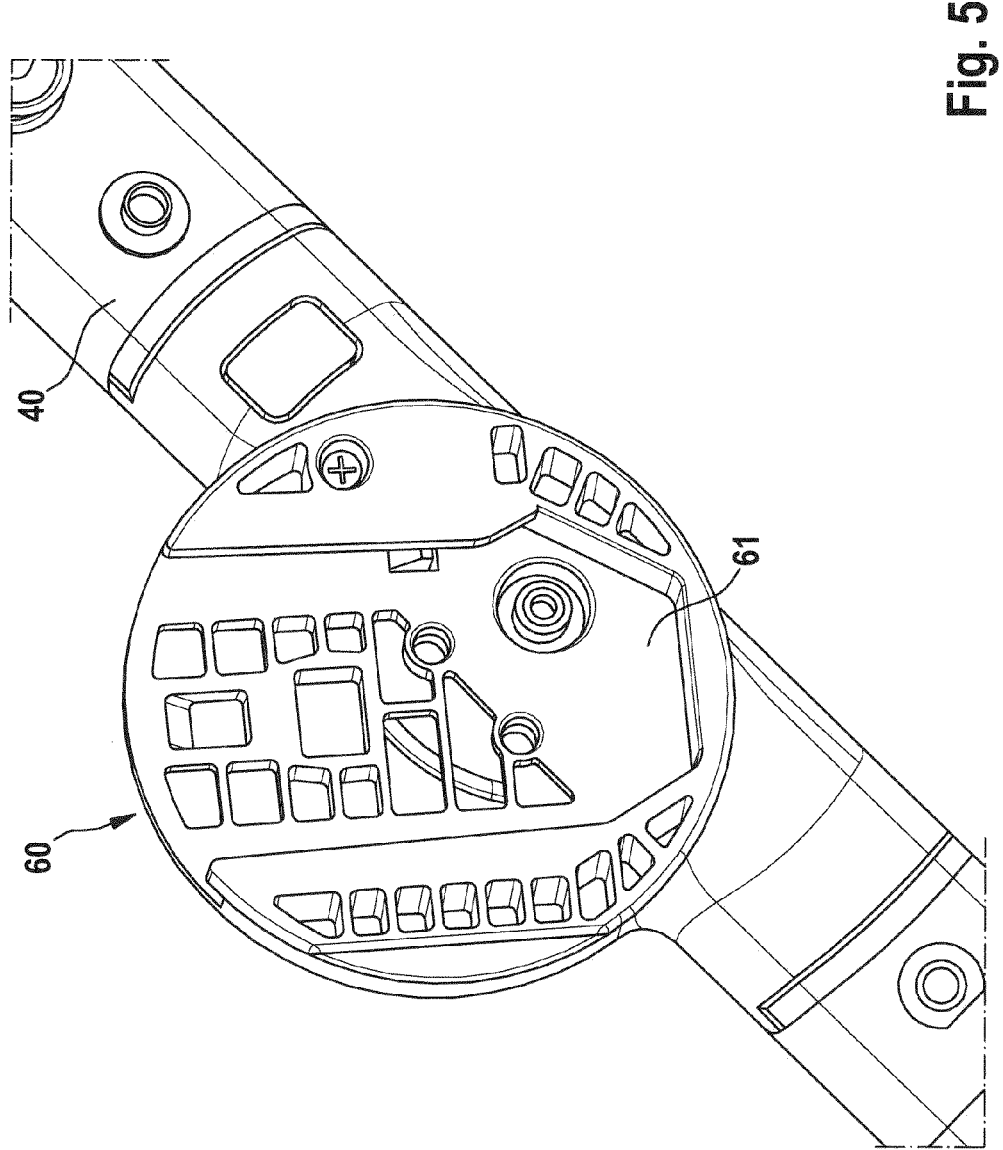
Figure 6A:
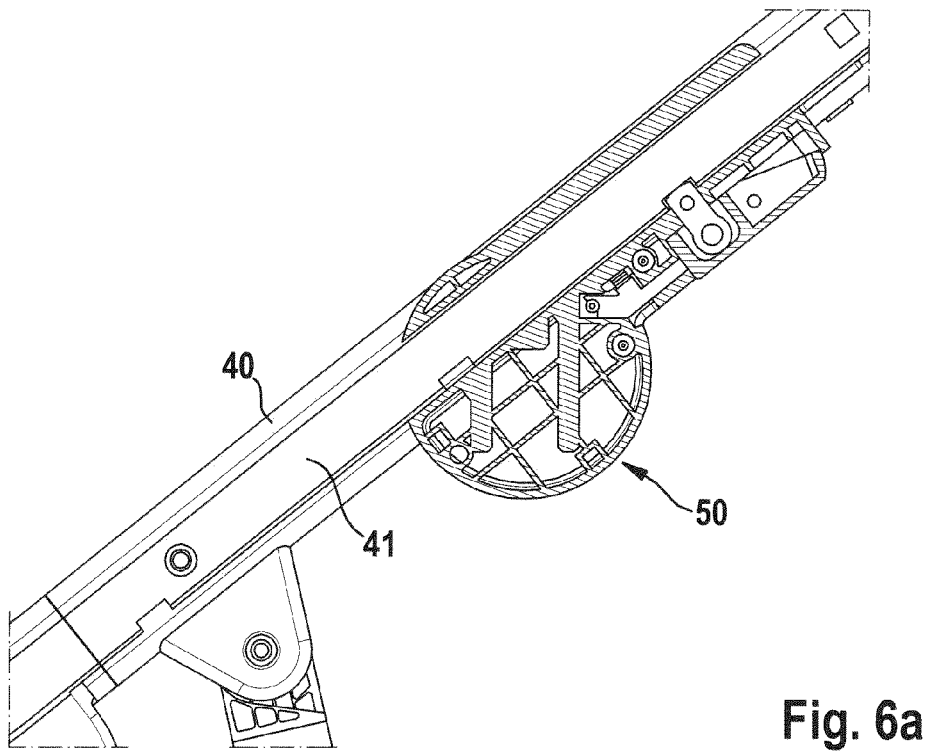
Figure 6B:
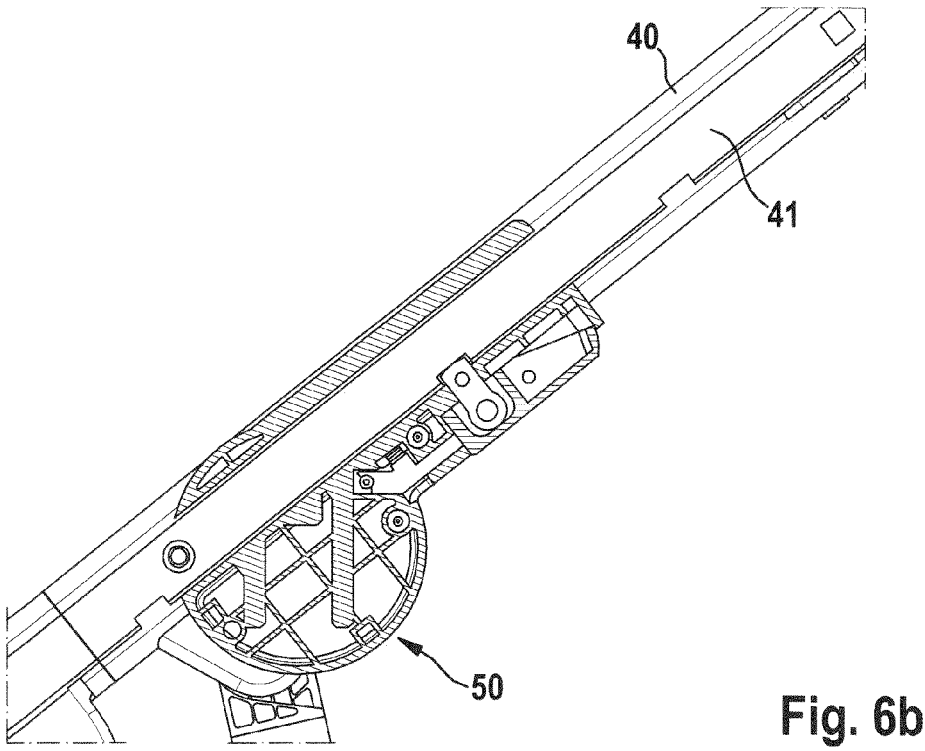
Figure 7:
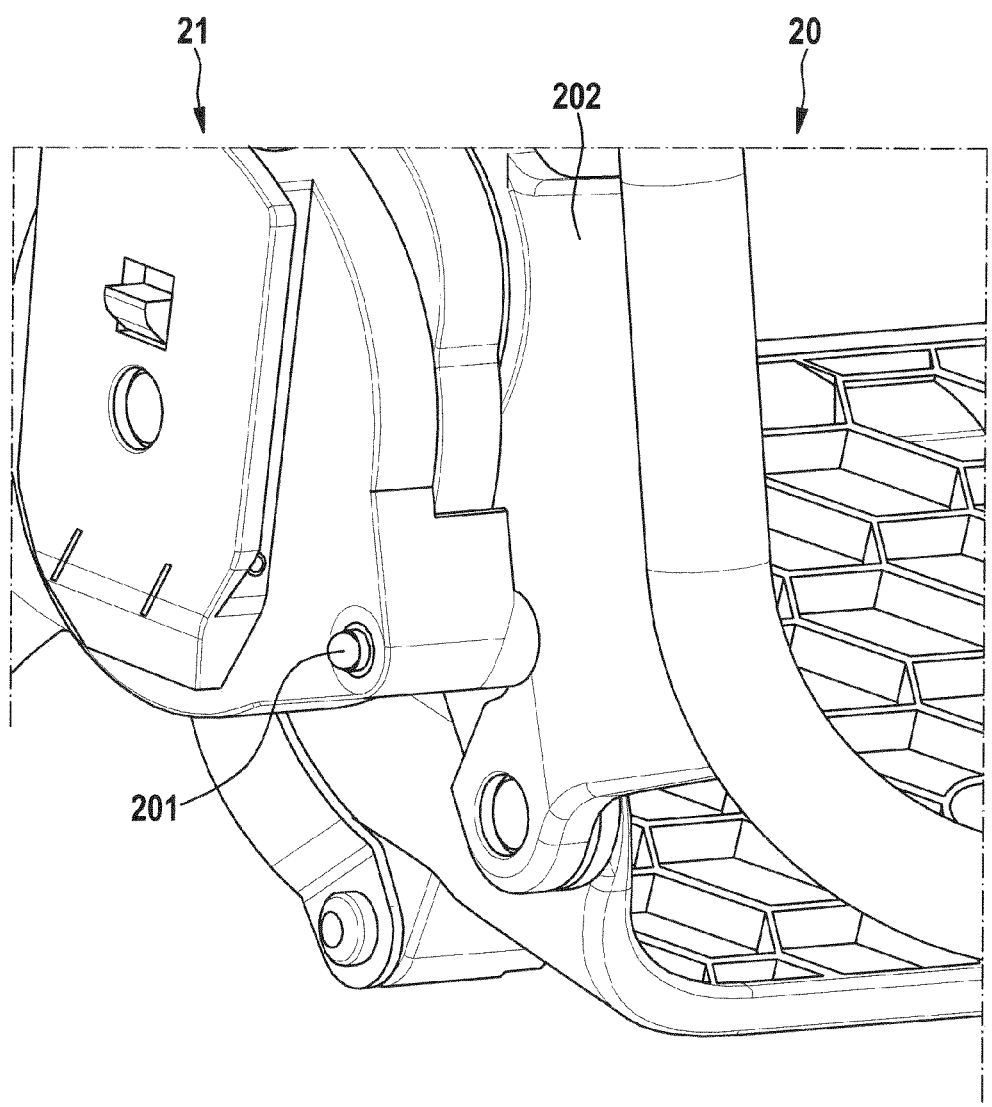
Figure 8:
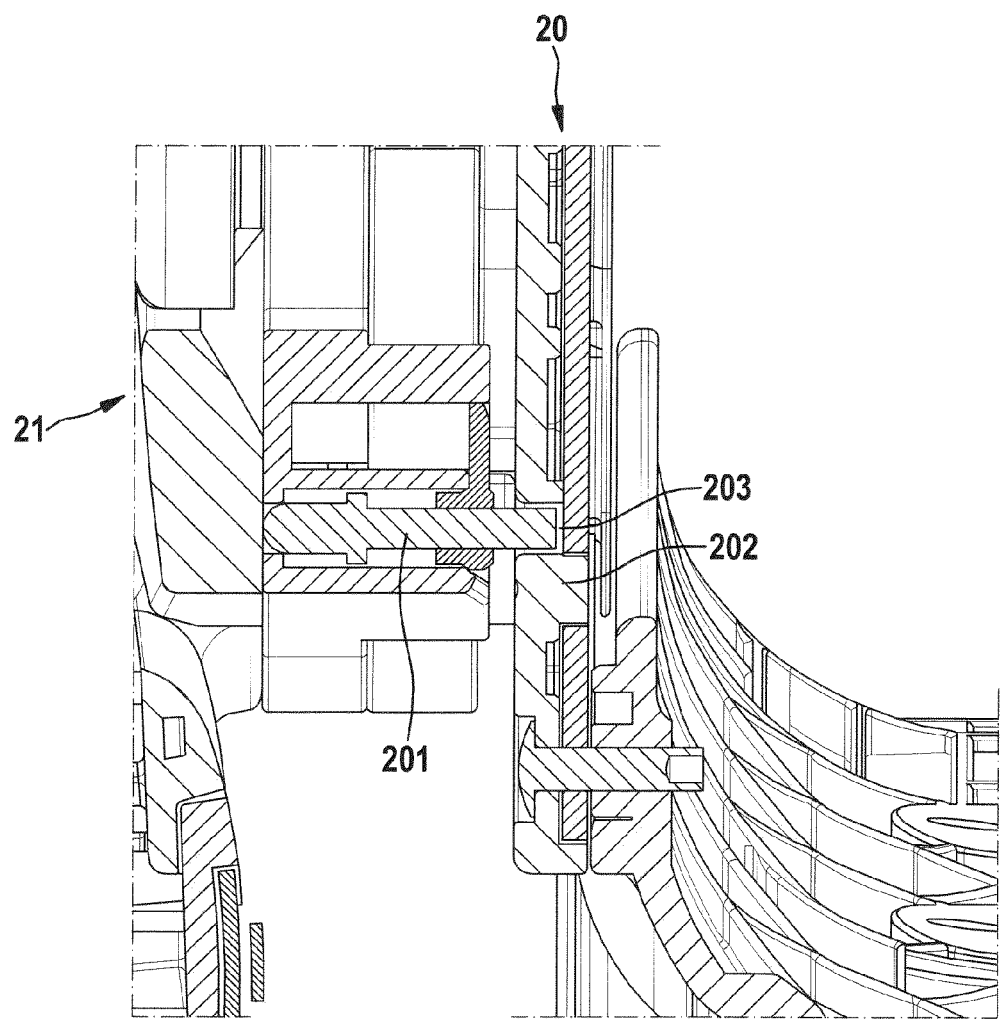
Figure 9:
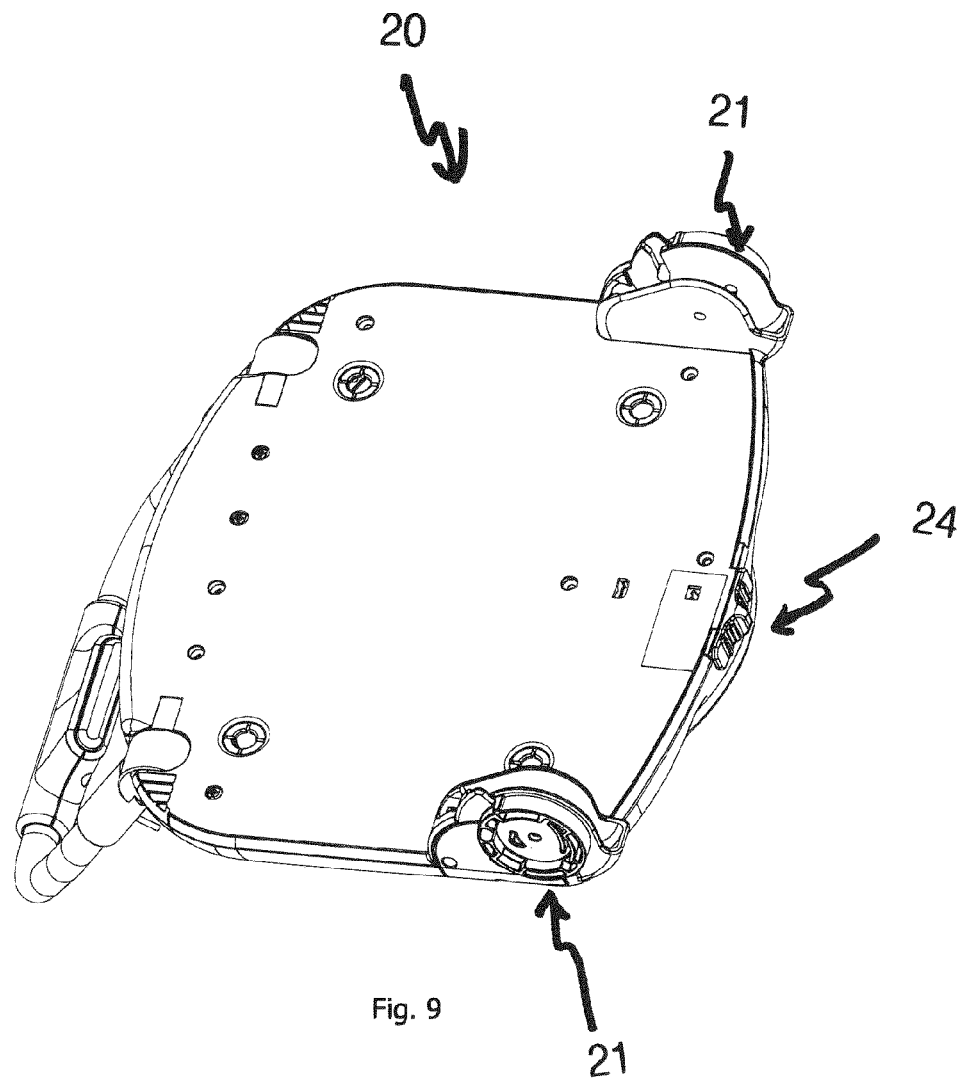
Figure 10:
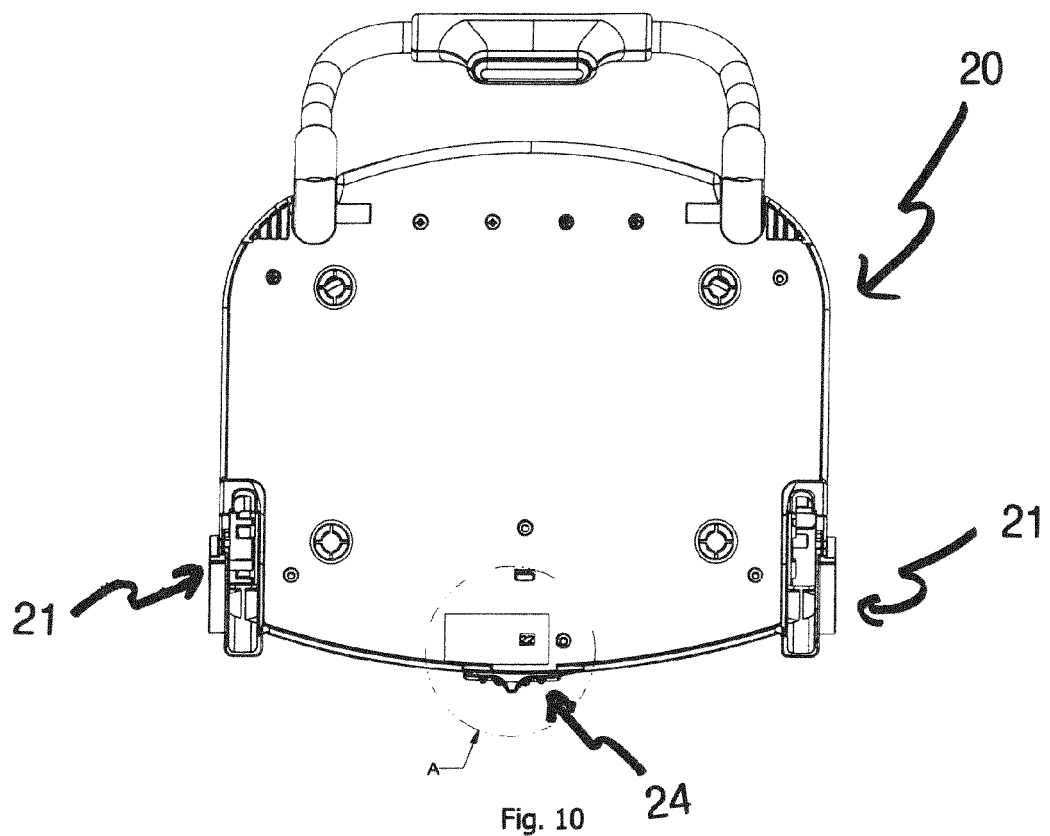
Figure 11:
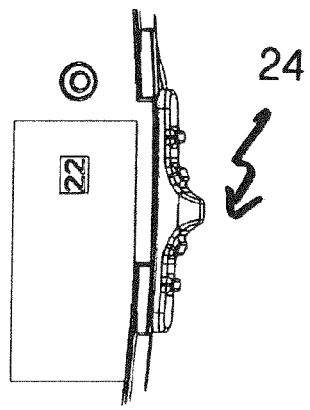
Figure 11:
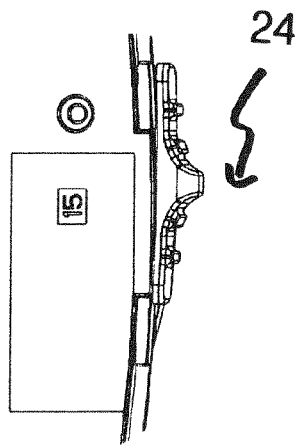
Figure 12:
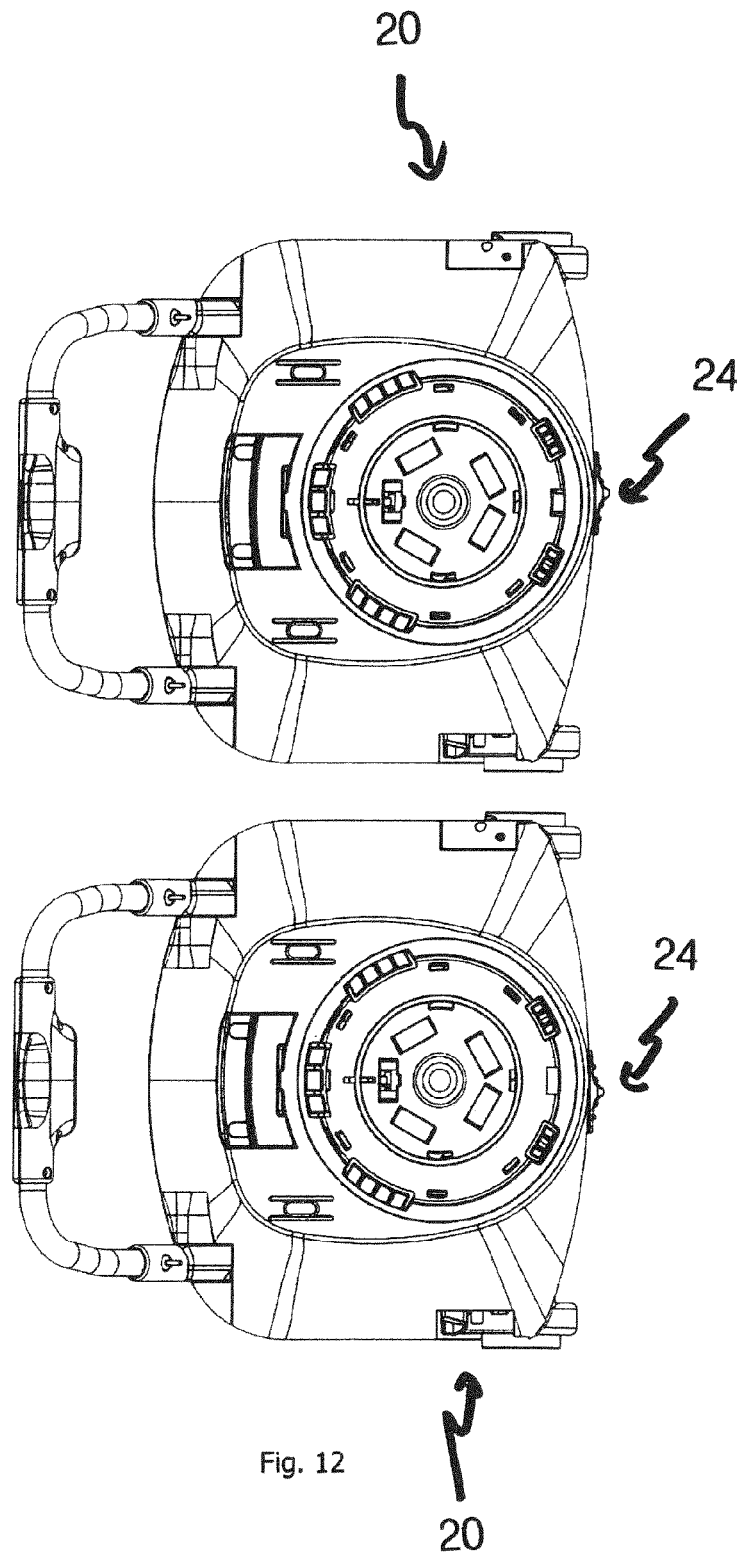
Figure 13:
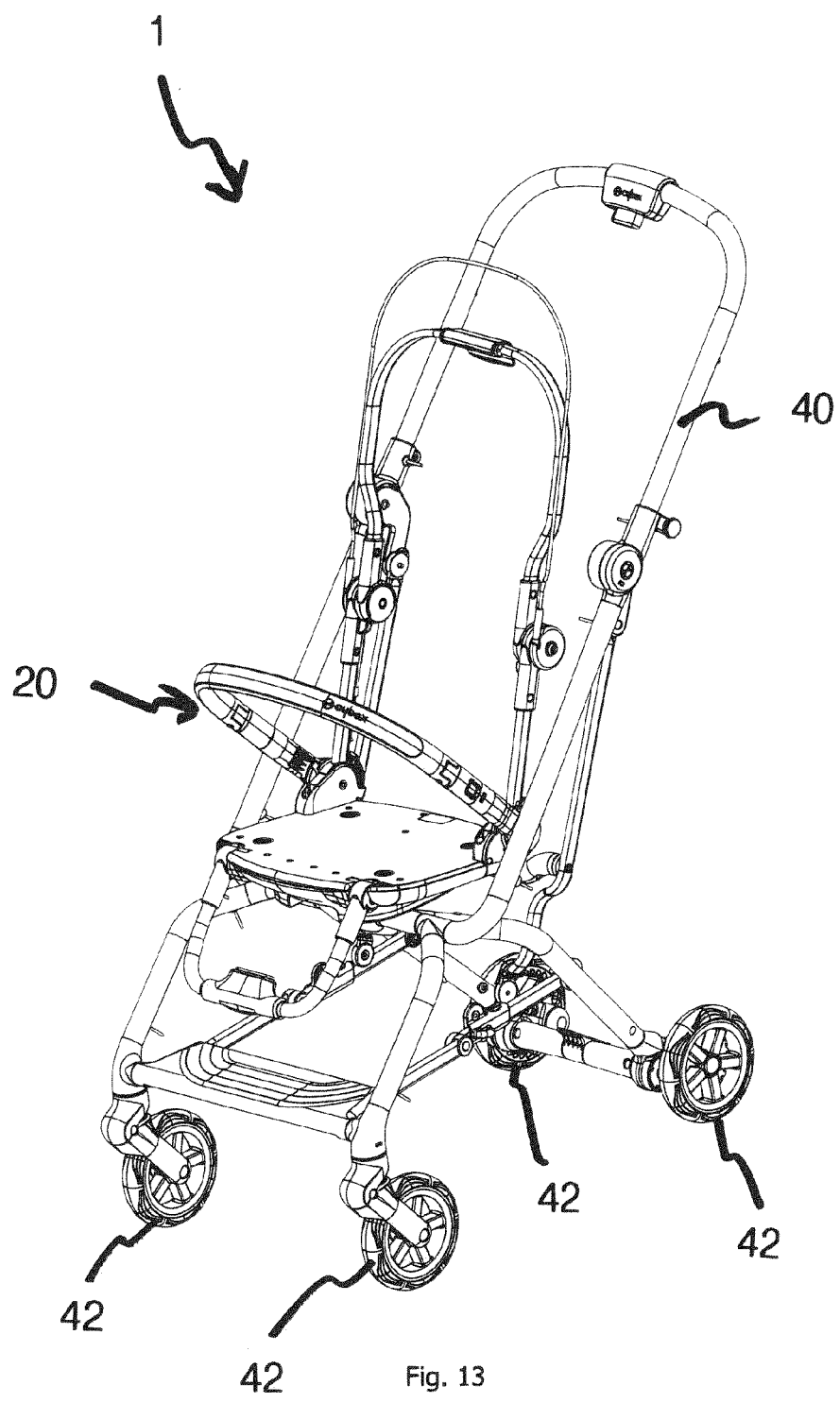

In the following, the invention is described with reference to execution examples which are explained in more detail with reference to the figures. Herein, show:

FIG. 1 a schematic representation of a stroller without receiving units in oblique view;

FIG. 2 a schematic representation of a stroller with receiving units in oblique view;

FIG. 3 a schematic detailed view of an adapter connecting element of the second receiving unit;

FIG. 4 a schematic detail view of an adapter element of a first adapter;

FIG. 5 a schematic detail view of an adapter element of a first adapter;

FIG. 6a a schematic detail view of an adapter element of a first adapter in a rear upper position;

FIG. 6b a schematic detail view of an adapter element of a first adapter in a middle position;

FIG. 6c a schematic detail view of an adapter element of a first adapter in a front lower position;

FIG. 7 a schematic detail view of an adapter connecting element of a receiving unit in an oblique view;

FIG. 8 a schematic detail view of an adapter connecting element of a receiving unit in a sectional view;

FIG. 9 a schematic detail view of a seat section of a receiving unit in an oblique view;

FIG. 10 a schematic detail view of a seat section of a receiving unit in a top view;

FIG. 11 a schematic detail view of a switching element of a receiving unit in top view;

FIG. 12 a schematic detail view of a seat section of a receiving unit in top view from below;

FIG. 13 a schematic view of a stroller with a receiving unit in an oblique view.

Figure 15:
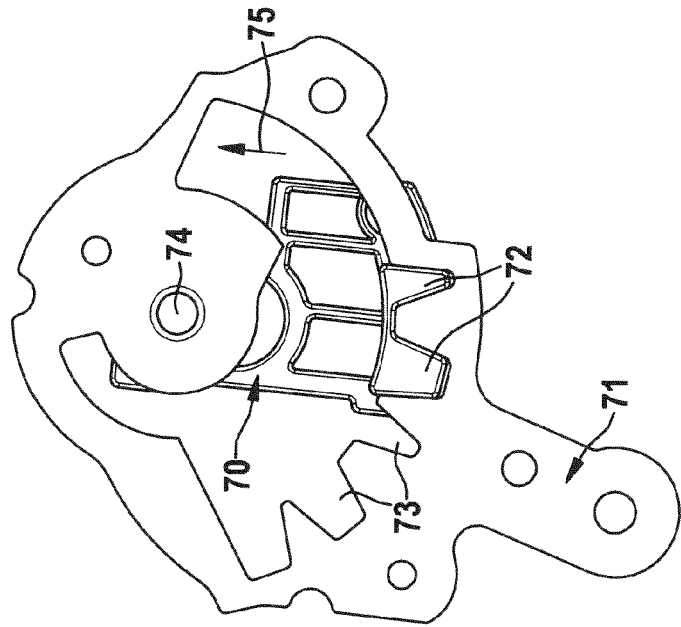
Figure 14:
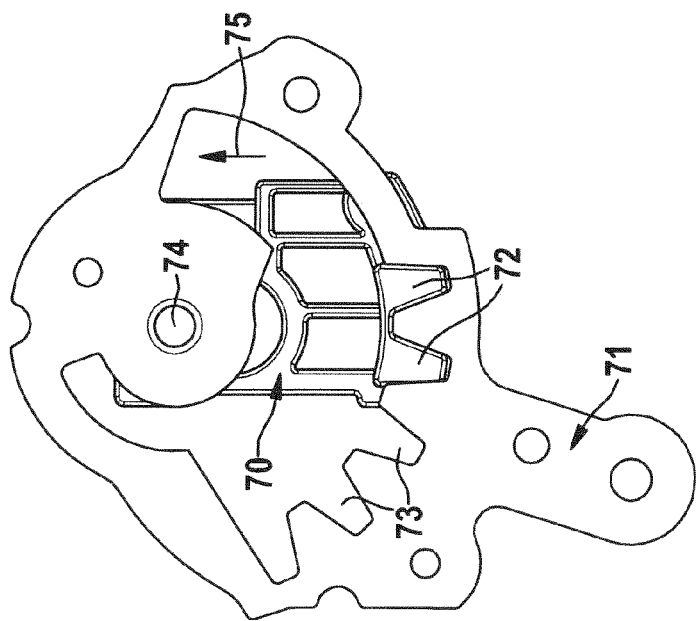

FIG. 14 a mechanism for adjusting a first number of different tilt angles between back section and seat section of a child receiving device in the form of a seat unit; and FIG. 15 a mechanism for adjusting a second different from the first number of different tilt angles between back section and seat section of a child receiving device in the form of a seat unit.

In the following, the same reference numerals are used for the same as well as the same acting parts.

FIG. 2 shows a schematic diagram of a stroller 1 with two receiving units 20, 30 in oblique view. Four wheels 42 (two front wheels and two rear wheels) are mounted in the lower region of the frame 40 or stroller frame 40. A first adapter 50 and a second adapter 60 are fixed to the frame 40. Furthermore, in FIG. 2, a first receiving device 20 is coupled to the first upper adapter 50. The first receiving device is oriented in the direction of travel of the stroller 1. The second receiving unit 30 is coupled to the second, lower adapter 30. The second receiving device 30 is oriented opposite to the direction of travel of the stroller 1.

In FIG. 3, a schematic detailed view of an adapter connecting element 31 of the second receiving device 30 is shown. In this execution example, a protrusion 311 of the adapter connecting element 31 is formed as a rib extending approximately vertically with the chassis frame 40 of the stroller being ready for operation. The adapter connecting element 21 (not shown here) of the first receiving device 20 can be identical except for the rib missing there. Also conceivable would be an adapter connecting element 31 having a second rib (not shown) on the right side.

FIG. 4 represents a schematic detailed view of an adapter element of the first adapter 50. In this execution example, the first adapter 50 is preferably the upper adapter 50. Furthermore, in FIG. 4, the first recess 51 is formed as a groove. Furthermore, the first adapter 50 has a two recess 52, which in this execution example is also formed as a groove. Furthermore, the first adapter 50 has a contact surface (no reference sign). Thus, by means of the first adapter 50, a connection of the frame 40 optionally with the first or the second child receiving device 20, 30 (not shown) can be achieved.

In FIG. 5, a schematic detailed view of an adapter element of the second adapter 60 is shown. The second adapter 60 does not have any recesses. In this execution example, the second adapter 60 is the lower adapter 60.

In FIGS. 6a to 6b, a schematic detail view of an adapter element of a first adapter 50 is shown in different positions. In FIG. 6a, the first adapter 50 is shown fixed in a rear upper position. The first adapter 50 is attached to the strut 41 of the stroller frame 40 extending from the rear top to the front bottom. In FIG. 6b, the first adapter 50 is shown in an intermediate position. In FIG. 6c, the first adapter is fixed in a front bottom position.

FIG. 7 shows a schematic detailed view of an adapter connecting element 21 of a receiving unit 20 in an oblique view. In this execution example, the adapter connecting element 21 has a blocking element 201, which is formed as a pin that can be depressed against the force of a compression spring, which is not shown visibly. When the blocking element 201 is depressed, the blocking element 201 comes into contact with an element 202 of a tilt angle adjustment mechanism (not shown) such that tilt angle adjustment mechanism (not shown) is locked or blocked. The tilt angle adjustment mechanism is used to adjust the tilt angle of the child receiving device with respect to the horizontal.

FIG. 8 shows a schematic detail view of an adapter connecting element 21 of a receiving unit 20 in a sectional view. In FIG. 8, the blocking element 201 is shown in a depressed state, wherein the blocking element is pressed against a restoring force of a spring (not shown). The depressed blocking element (pin) is further depressed into a recess 203 of an element 202 of the tilt angle adjustment mechanism (not shown), so that the tilt angle adjustment mechanism (not shown) is locked or blocked.

The element 202 of the tilt angle adjusting mechanism is fixedly connected to the back section of the receiving device 20, and has only one recess (a hole) for cooperating with the pin. This one recess corresponds to the seat position of the allowable receiving device 20. In principle, two or three holes corresponding to the pin 201 for adjusting different tilt angles of the child receiving device are also conceivable.

In FIG. 9, a schematic detailed view of a seat section 22 of a receiving unit 20 is shown in an oblique view. Furthermore, FIG. 9 shows a switching element 24.

In FIG. 10, a schematic detailed view of a seat section 22 of a receiving unit 20 is shown in top view from below. Furthermore, FIG. 10 shows the switching element 24. FIG. 11 shows two different states or positions of the switching element 24.

In FIG. 12, a schematic detail view of a seat section of a receiving unit is shown in top view from below, where in particular the adaptive turntable can be seen in detail.

In FIG. 13, a schematic view of a stroller 1 with a receiving unit 20 is shown in oblique view.

In FIGS. 14 and 15, another example of a mechanism for adjusting the tilt angle between a back section and a seat section of a first receiving device in the form of a first seat unit (FIG. 14) and a mechanism for adjusting the tilt angle between a back section and a seat section of a second receiving device in the form of a second seat unit (FIG. 15) are shown schematically. The mechanism shown in FIG. 14 allows four different tilt angles, while the mechanism shown in FIG. 15 allows only three different tilt angles. Specifically, in FIGS. 14, 15, a type of tooth rim 70 may be associated with a seat section that is oriented substantially horizontally when assembled, while a complementary swing bearing 71 is part of a back section that is useably mounted relative to the seat section.

FIGS. 14, 15 each show a locking position between tooth rim 70 (with teeth 72 pointing radially outward or similar protrusions) and swing bearing 71 (here in the form of a flat ring with recesses 73 complementary to the aforementioned teeth 72).

For unlocking, the teeth 72 must be removed from the complementary recesses 73 so that the parts 70, 71 can then be pivoted relative to each other about an axis 74 defined by the hinge axis between seat section and back section. For this purpose, the tooth rim 70 is displaceable either radially with respect to the axis 74, i.e. in the direction of the arrow 75 in FIGS. 14, 15, or in the direction parallel to the axis 74 until the teeth 72 disengage from the associated recesses 73.

Locking takes place in the opposite direction after setting the desired tilt angle.

It should also be noted that in the embodiment according to FIG. 15, the two teeth 72 of the tooth rim 70 are of different readiness. In the same way, the swing bearing 71 also has recesses 73 of different widths, wherein the arrangement of these recesses 73 is such that, with the same number of recesses as in the design according to FIG. 14, only three instead of four different angular positions of the parts 70, 71 relative to one another are possible.

Accordingly, the tilt of the back section associated with the swing bearing 71 can then also be adjusted differently relative to the seat section in the first and second child receiving devices each in the form of a seat unit.

The invention claimed is:

1. A stroller comprising:
a chassis frame supported on a ground via at least three wheels; and
at least two receiving devices connected to the chassis frame via adapters,
wherein
the adapters are configured to be positioned on the chassis frame to facilitate a connection of the at least two receiving devices as well as an alignment and manipulation of the at least two receiving devices,
the adapters do not permit at least one configuration in which an overall center of gravity of the stroller in a top view and thus the overall center of gravity line do not lie within a projection area bounded by the at least three wheels or standing surfaces of the at least three wheels when the at least three wheels are in contact with the ground, or
only permit the at least one configuration such that the overall center of gravity of the stroller in the top view and thus the overall center of gravity line always lie within the projection area bounded by the at least three wheels or the standing surfaces of the at least three wheels when the at least three wheels are in contact with the ground.

2. The stroller according to claim 1, comprising:
a stroller frame;
at least a first adapter and a second adapter via which the at least two receiving devices is detachably connected to the stroller frame;
wherein
a first receiving device of the at least two receiving devices has a first adapter connecting element, by means of which the first receiving device is mechanically connected to the first adapter or the second adapter, and a second receiving device of the at least two receiving devices has a second adapter connecting element, by which the second receiving device is mechanically connected exclusively to one of the first adapter or the second adapter.

3. The stroller according to claim 2, wherein
the first adapter has at least one recess, and
the second adapter connecting element of the second receiving device has at least one protrusion, in particular a rib, which is complementary to the at least one recess of the first adapter.

4. The stroller according to claim 3, wherein
the second adapter does not have a recess complementary to the at least one protrusion of the second adapter connecting element of the second receiving device or
in that the first adapter connecting element of the first receiving device does not have a protrusion complementary to the recess of the first adapter.

5. The stroller according to claim 4, wherein
the at least one protrusion of the second adapter connecting element of the second receiving device couples with the at least one recess of the first adapter when the second receiving device is connected to the first adapter in a first orientation.

6. The stroller according to claim 5, wherein
the first adapter has a further recess, and
the at least one protrusion of the second adapter connecting element of the second receiving device couples to the further recess of the first adapter when the second receiving device is connected to the first adapter in a further orientation, which is at least substantially opposite to the first orientation.

7. The stroller according to claim 2, wherein
the second adapter has an at least substantially planar contact surface.

8. The stroller according to claim 2, wherein
the adapters are arranged on the at least two receiving devices instead of on the stroller frame.

9. The stroller according to claim 1, comprising:
a stroller frame;
at least a first adapter and a second adapter, via which the at least two receiving devices is detachably connected to the stroller frame;
wherein
a first receiving device of the at least two receiving devices comprises a seat section and a back section pivotable relative thereto as well as a mechanism for adjusting a tilt angle between the back section and the seat section and a second receiving device of the at least two receiving devices comprises a seat section and a back section pivotable relative thereto as well as a mechanism for adjusting the tilt angle between the back section and the seat section, wherein at least one particular tilt angle is achievable with respect to one of the first and second receiving devices and is not achievable with respect to the other of the first and second receiving devices.

10. The stroller according to claim 9, wherein
the mechanism of the first receiving device allows adjustment of a greater number of different tilt angles between the back section and the seat section than the mechanism of the second receiving device.

11. The stroller according to claim 10, wherein
the tilt angle corresponds to a largest adjustable tilt angle of the first receiving device or
the tilt angle between the back section and the seat section of the second receiving device is between 130° and 150°.

12. The stroller according to claim 9, wherein
positions between the back section and the seat section of the first receiving device include:
a seat position for which the tilt angle of the back section relative to the seat section is in a range from at least about 90° to at least about 140°;
a lying position for which the tilt angle of the back section relative to the seat section is in a range from at least about 140° to at least about 180°; and
one or more intermediate positions for which the tilt angle of the back section relative to the seat section is smaller than the tilt angle in the lying position and larger than the tilt angle in the seat position.

13. The stroller according to claim 9, wherein
positions between the back section and the seat section of the second receiving device:
a seat position for which the tilt angle of the back section relative to the seat section is in a range from at least about 90° to at least about 140°;
a lying position for which the tilt angle of the back section relative to the seat section is in a range from at least about 140° to at least about 180°; and one or more intermediate positions for which the tilt angle of the back section relative to the seat section satisfies at least one of:

the tilt angle is less than at least about 150°, and greater than the tilt angle in the seat position; and the tilt angle is greater than at least about 150°, and less than the tilt angle in the lying position.

14. The stroller according to claim 1, comprising:

a stroller frame;

at least a first adapter and a second adapter via which the at least two receiving devices is detachably connected to the stroller frame;

wherein at least one of the first adapter and the second adapter has an adjusting mechanism by which the at least one of the first adapter and the second adapter is detachably connected to the stroller frame.

15. The stroller according to claim 14, wherein the at least one of the first adapter and the second adapter is displaceably mounted on the stroller frame.

16. The stroller according to claim 14, wherein the at least one of the first adapter and the second adapter is configured to be fixed, in several different positions on the stroller frame by the adjusting mechanism.

17. The stroller according to claim 14, wherein the at least one of the first adapter and the second adapter is fixed, in exactly or at least three positions to the stroller frame by the adjusting mechanism.

18. The stroller, according to claim 1, comprising:

a stroller frame;

at least one adapter by which at least one of the at least two receiving devices is detachably connected to the stroller frame;

wherein an adapter connecting element of the at least one of the at least two receiving devices has a blocking mechanism for blocking a mechanism for adjusting a tilt angle of the at least one of the at least two receiving devices with respect to horizontal, wherein the mechanism is blocked by the blocking mechanism when the at least one of the at least two receiving devices is connected to the stroller frame in a first orientation via the at least one adapter, wherein the mechanism, is not blocked or is released when the at least one of the at least two receiving devices is connected to the stroller frame via the adapter in a further orientation, which is at least substantially opposite to the first orientation.

19. The stroller according to claim 18, wherein the at least one adapter comprises a contact protrusion surface arranged such that the contact protrusion surface actuates the blocking mechanism when the at least one of the at least two receiving devices is connected to the stroller frame via the at least one adapter in a first orientation.

20. The stroller according to claim 19, wherein the blocking mechanism comprises a spring-loaded pin which is pressed by the contact protrusion surface of the at least one adapter against a restoring force acting on the spring-loaded pin into a recess of the mechanism, so that the mechanism is locked or blocked.

21. The stroller according to claim 1, wherein at least one of the at least two receiving devices is rotatably mounted on a stroller frame.

22. The stroller according to claim 21, wherein a rotational position of the at least one of the at least two receiving devices is adjustable.

23. The stroller according to claim 22, wherein the at least one of the at least two receiving devices is lockable in a forward position and in a rearward position.

24. The stroller according to claim 23, wherein the at least one of the at least two receiving devices is connectable to the stroller frame via a rotatably mounted adapter.

25. The stroller according to claim 24, wherein the rotatably mounted adapter, or the at least one of the at least two receiving devices is assigned a switching element, such as a slider, rotary knob, push-button, or push-button, by which adjustable rotary positions or orientations of the at least one of the at least two receiving devices are fixable.

26. The stroller according to claim 25, wherein the switching element is adjusted exclusively from a first switching position into at least one second switching position when the at least one of the at least two receiving devices is not coupled to the rotatably mounted adapter.

27. The stroller according to claim 25, wherein the rotatably mounted adapter is unlocked and the adjustable rotary positions or orientations of the at least one of the at least two receiving devices are freely fixable, provided that the switching element is in a first switching position.

28. The stroller according to claim 25, wherein the at least one of the at least two receiving devices is configured to be locked in a forward position and in a rearward position, provided that the switching element is in a second switching position.

29. The stroller according to claim 1, wherein the receiving device is configured as a device for transport of animals or other objects.

* * * * *